April 17, 1934.  C. E. FURGASON  1,955,180
HYDRAULIC BRAKE
Filed March 23, 1931
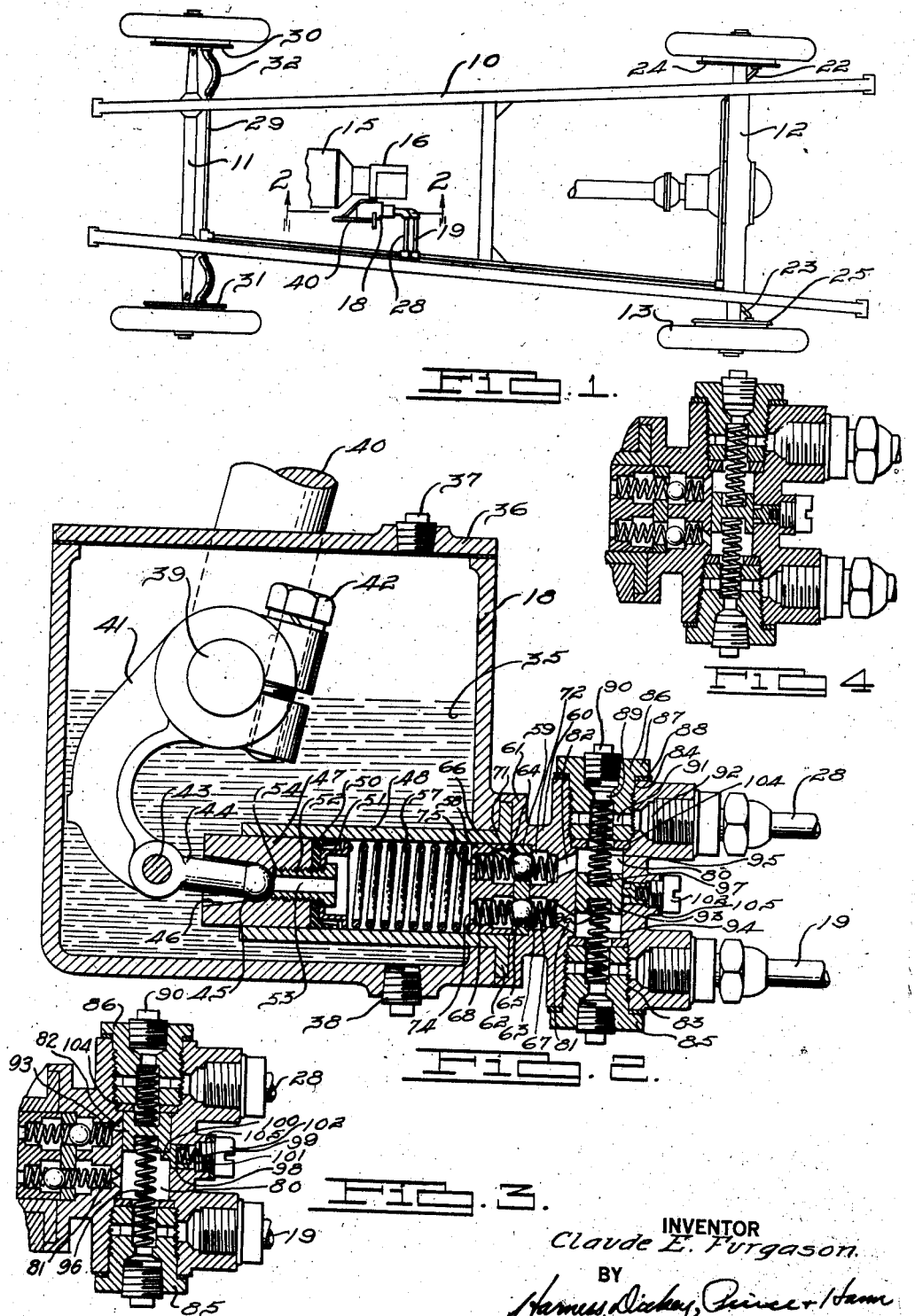
INVENTOR
Claude E. Furgason.
BY
Harness, Dickey, Prince & Jam
ATTORNEYS.

Patented Apr. 17, 1934

1,955,180

UNITED STATES PATENT OFFICE 1,955,180

HYDRAULIC BRAKE

Claude E. Furgason, Lansing, Mich.

Application March 23, 1931, Serial No. 524,540

7 Claims. (Cl. 60—54.6)

This invention relates to a brake mechanism for motor vehicles, and has particular relation to a brake mechanism of the hydraulic type wherein fluid under pressure is used to actuate the brakes.

The principal objects of the invention are to provide a brake mechanism of the above designated character, wherein means are utilized for preventing the escape of fluid from any one of the connections between the brakes and the fluid reservoir or master cylinder, should a leak occur therein; to provide a means for automatically so disconnecting that part of the mechanism in which a leak occurs, from the remainder of the latter, that a leak in any one of the connections between the brakes and the master cylinder will not affect the operation of the remaining brakes; to provide a means for permanently disassociating the leaking connection from the remainder of the mechanism until it is repaired; to provide a means for rendering the automatic means inoperable whenever this is desired; and to provide a braking mechanism wherein the several connections between the master cylinder and the brakes are separately but cooperatively connected to the cylinder.

In motor vehicles having hydraulic brakes, ordinarily only one operating lever is used for actuating all of the brakes. To secure an efficient and satisfactory operation of the brakes, it is necessary that the entire system be sealed against the escape of the fluid for if this were not true the fluid in the system could not be subjected a degree of pressure sufficient for satisfactory operation of the brakes. Ordinarily, heretofore, when any part of the system was not properly sealed against the escape of fluid, or a leak occurred therein, the operation of all of the brakes was affected until the defective connection was remedied.

A brake mechanism might be designed in which each of the brakes would be operated separately of the others, and in this event failure of any one of the connections between the brakes and the master cylinder would not affect the others, but such a system is not practical because several operating pedals or levers would be required. Moreover, there would be no means insuring operation of all of the brakes with the same degree of force which is practically necessary in braking motor vehicles, particularly when they are operating even at ordinary speeds.

According to the present invention, all of the brakes are operated by a single pedal which is operatively connected to a master cylinder in which the fluid is stored. The brakes may be connected either singly or in pairs to the master cylinder, although fluid is forced through all of the connections by a common mechanism actuated by the foot pedal. Neutralizing valves associated with the several connections are provided to insure uniform operation of the brakes. The connections to the brakes also are interrelated by means of a reciprocatory valve, normally in a neutral position in which it does not have any effect on the operation of the brakes. However, should a leak occur in any one of the connections, the pressure in that connection automatically will be reduced because of the leak, and since the pressure in another of the connections then is relatively greater, the reciprocatory valve will be operated and the leaking connection disconnected from the master cylinder. Should the leak be of minor consequence, the connection in which it has occurred, will be only partially disassociated or disconnected from the cylinder, while if the leak is excessive, a permanent disconnection will result, thereby preventing the escape of such an amount of fluid which would seriously impair the operation of the remaining brakes.

For a better understanding of the invention, reference may be had to the accompanying drawing, forming a part of the specification, in which:

Fig. 1 is a diagrammatic plan view of a chassis of a motor vehicle having a hydraulic brake system according to one form of the invention;

Fig. 2 is a cross sectional view on a larger scale, taken substantially along the line A—A of Fig. 1;

Fig. 3 is a detail view of a part of the construction shown by Fig. 2, illustrating the relation of certain parts during one phase of their operation.

Fig. 4 is a fragmentary view of the construction shown in Fig. 2, illustrating the relation of certain parts during another phase of operation.

Referring to Fig. 1, the chassis of a motor vehicle is illustrated at 10, and includes front and rear axles 11 and 12 having conventional types of wheels 13 mounted thereon. The clutch housing of the power unit for the vehicle is indicated at 15 and a transmission 16 is disposed immediately to the rear of the housing. The vehicle illustrated is provided with the hydraulic type of brakes and in a system of this character, a master cylinder 18 for the system is provided adjacent the transmission 16. A conduit 19 connected to the cylinder 18 extends to a point adjacent the rear axle 12, and is connected by other conduits 22 and 23 to brakes 24 and 25 associated respectively with the wheels at opposite ends of the axle. Ordinarily the conduits 22 and 23 are movably connected to the conduit 19 in such manner that vertical movement of the brakes 24 and 25 with respect to the conduit 19 may be permitted.

A second conduit 28 connected to the cylinder 18 extends to a point adjacent the front axle 11 and is connected by means of a transversely extending conduit 29 to brakes 30 and 31 associated respectively with the wheels at opposite ends of the axle. Flexible connections 32 are provided between the ends of the conduit 9 and the brakes 30 and 31, to permit turning of the wheels which is necessary in steering the vehicle.

The hydraulic brakes are of conventional construction, and accordingly a detailed description of them is not necessary. However, it should be understood that a brake drum is employed in each of the brakes, in conjunction with a brake band or shoe and that normally the band or shoe is separated from the drum by springs or other suitable means. Also it should be understood that when fluid is forced through the conduits 19 and 28 from the cylinder 18, that a suitable mechanism in the brake housing is operated to force the brake bands or shoes against the brake drum, against the action of the springs.

As shown by Fig. 2, the master cylinder 18 comprises a receptacle for fluid 35 constituting the actuating medium of the system, which is provided with an ordinary cover 36 removably secured and sealed to the top of the receptacle. A removable plug 37 is provided in the cover, for supplying fluid to the receptacle while a second removable plug 38 is disposed in the bottom of the receptacle for draining the latter whenever this is necessary. A shaft 39 extends transversely through the walls of the cylinder 18 in journaled relation thereto, and one of its ends projecting to the outside of the cylinder, is secured to a foot pedal 40 which in this instance constitutes the brake pedal. Inside of the cylinder 18, the shaft 39 is provided with an operating arm 41 which is rigidly secured to the shaft as indicated at 42. This arm extends toward the bottom of the cylinder and is pivotally connected as indicated at 43 to an arm 44 which has its free end 45 of ball shape. Normally, the free end of the arm 44 projects into an outwardly flared opening 46 provided in one end of a piston member 47 which is slidably mounted in a cylindrical member 48 extending through one wall of the master cylinder receptacle 18 and serves as the actual cylinder element thereof.

The inner end of the opening 46 is of a ball socket shape, complementary to the ball 45 on the arm 44. The inner end of the piston member 47 is provided with a flexible cylinder sealing member 50 and a metallic cup shape member 51, which are secured to the piston member by a centrally apertured plug 52 threaded thereinto. The aperture in the plug which is indicated at 53, communicates with an aperture 54 extending to the base of the socket in the inner end of the opening 46 in the piston member. From this description it is apparent that when the ball 45 on the arm 44 engages the socket in the opening 46, the opening 54 is closed, and accordingly the interior of the cylinder 48 is disconnected from the interior of the master cylinder 18.

Normally, the piston member 47 is urged toward the arm 44, by means of a helical spring 57 disposed in the cylinder 48 and engaging the cup member 51 at one end and a sleeve 58 in the opposite end of the cylinder. In turn the sleeve engages a plate 59, seated in a valve housing 60 disposed exteriorly of the master cylinder 18.

The housing 60 has a flange portion 61 which engages a flange 62 on the outer end of the cylinder 48, and both flanges are secured by any suitable means to the wall of the cylinder 18 through which the cylinder projects. Circular openings 63 and 64 are provided in the plate 59 and constitute valve seats for balls 65 and 66 normally disposed in these openings respectively and substantially in contact with the sides thereof. Springs 67 and 68 are disposed on opposite sides of each of the balls 65 and 66 in apertures 71 and 72 formed respectively in the sleeve 58 and in the valve housing 60, normally retain the balls 65 and 66 in such positions in the openings 63 and 64 that passageway through them is closed. Openings 74 and 75 in the sleeve 58 connect the interior of the cylinder 48 to the apertures 71 in the sleeve at one side of the balls 65 and 66. The ball valves 65 and 66 particularly are employed to keep the fluid in the brake connections under a slight pressure when the brakes are not being operated.

The parts of the mechanism previously described, such as the brake pedal 40, the pivoted link 44 thereon, and a piston member having a tapered opening cooperating with the ball 45, in general form no part of this invention, as it is the subject matter of Letters Patent of the United States No. 1,915,701, issued June 27, 1933 to Horace T. Thomas, for Improvement in hydraulic brakes.

The valve housing 60 is provided with a centrally located, vertically extending opening 80, forming a cylinder, which is normally connected to the aperture 72 adjacent the ball valves 65 and 66 by means of diverging apertures 81 and 82. Upper and lower ends of the opening 80 are enlarged as indicated at 83 and 84 and normally are closed by threaded plugs 85 and 86, having flanged portions 87 engaging sealing elements 88. Each of the plugs 86 is provided with a central opening 89, closed at its outer end by means of a plug 90 but which communicates at its inner end with the opening 80. Also each of the plugs 86 has one or more transversely extending openings 91 which communicate with the opening 89 and with an opening 92 in the valve housing, in turn communicating with one of the conduits 19 and 28 extending to the brakes.

A slide valve 93 is slidably mounted in the opening 80 in the valve housing but is normally maintained in a position midway between the openings 81 and 82, by means of helical springs 94 and 95 partially disposed in the openings 89 in the plugs 85 and 86 and in recesses 96 and 97 in opposite faces of the member, and held under a slight compression therebetween.

The operation of the mechanism described above is as follows: Should the brake pedal 40 be depressed, the link 44 forces the ball 45 against the ball socket end of the opening 46 in the piston, thereby closing the aperture 54 extending through the piston member 47 and forces the piston into the cylinder 48. Hence, fluid in the cylinder 48 cannot escape therefrom past the piston while the brake pedal is being depressed in this manner. It should be understood that the braking system normally is filled with liquid and this may be accomplished, at least in part, by removing the upper plug 90 and bleeding the air from the system therethrough. Also when the brake pedal is being returned to its inoperative position, the ball 45 may draw away from the opening 54, and accordingly fluid in the receptacle 18 may flow into the cylinder 48 during this time to replenish any deficiency in the volume of liquid in the system that may then exist.

Depression of the foot pedal 40 causes the piston member 47 to move into the cylinder 48 against the action of the helical spring 57, which forces the fluid in the cylinder 48 against the balls 65 and 66, causing the balls to move out of the openings 63 and 64 in the plate 59, against the action of the springs 67, sufficiently to permit the fluid in the cylinder 48 to flow through such openings, all as illustrated in Fig. 4. This fluid then flows through the openings 81 and 82, through the opening 80, the openings 91 and into the conduits 19 and 28 connecting the valve housing to the brakes. When the foot pedal 40 is released, the spring 57 returns the piston member 47 to its initial position at the left end of the cylinder 48, and the balls 65 and 66 are returned to the position indicated in Fig. 2 by the force of the springs 67.

Should a leak occur in the conduit 28, for example, and the brake pedal 40 be depressed, the pressure of the fluid at the upper side of the slide valve 93 located in the space 80 of the valve housing, will be less, due to such leakage, than the pressure on the fluid in the space located below this valve. This excess pressure on the lower side of the valve 93 causes the latter to move upwardly an amount determined by the difference in pressure. If the leak in the conduit 28 be rather large this difference in pressure will be greater and accordingly the valve 93 will move upwardly a greater distance and consequently close the opening 82 a greater amount. If the leak in the conduit 28 is excessive, the valve 93 will be moved into a position as shown by Fig. 3 wherein it completely closes the opening 82 and disconnects the conduit 28 from the cylinder.

If the leak is relatively small, then upon a momentary application of the brakes a sufficient pressure differential between the lines 19 and 28 will not have time to build up to operate the valve 93. Should the brake be applied for a material length of time, however, the valve 93 will operate to close the leaky line for the following reasons. The springs (not shown) conventionally employed for returning the elements of the brakes on the wheels to normal inoperative position are relatively strong and must be overcome before application of the brakes is possible. The force of these brake springs is materially greater than the force necessary to compress the springs 67, 68, 94 and 95, and the force necessary to compress the springs 67 and 68 is less than the force necessary to compress the springs 94 and 95. As a matter of illustration only let it be considered that a pressure of two pounds per square inch is required to move the balls 65 and 66 against the pressure of their corresponding springs 67 and 68 to permit liquid to flow by them, and that it requires a pressure differential of three pounds per square inch on opposite sides of the valve 93 to move it against the force of either the spring 94 or 95 to cut off the corresponding line 19 or 28. Under such conditions let it be assumed that there is a slight leak in the line 28 insufficient to operate the valve 93 upon a momentary application of the brakes. If now the brake pedal 40 is depressed with sufficient pressure, the liquid in the cylinder 48 is placed under pressure which is transmitted through the lines 19 and 28 and the brakes are applied. The pressure of the liquid in lines 19 and 28 will be less than the pressure of the liquid in the cylinder 48 by two pounds per square inch due to the differential required to operate the balls 65 and 66. If the pedal 40 is held in its depressed condition, the slight leak assumed in line 28 will reduce the pressure therein, and as such pressure drops additional liquid will be fed into it from the cylinder 48 to maintain the two pound differential. As liquid is fed from the cylinder 48 into the line 28 to maintain the two pound differential, the pressure of the liquid in the cylinder 48 will drop until it is less than the pressure in the line 19, and if the pressure in the cylinder 48 dropped sufficiently, the balls 65 and 66 would assume the positions indicated in Fig. 3. However, before the balls assume fully the positions indicated in Fig. 3, a pressure differential of three pounds per square inch will have been created between the lines 19 and 28 and will have caused the valve 93 to move to shut off the leaky line 28. Accordingly, it will be understood that the device of the present invention may be caused to operate upon the presence of a relatively small leak to shut off the leaky line.

For the purpose of retaining the valve 93 in this last mentioned position, until the conduit 28 may be repaired, for example a lock 98 is slidably mounted in an opening 99 in the valve housing, and is provided with a projection 100 adapted to be moved in the opening 80 and to engage one end of the valve. A light spring 101 disposed in the opening 99 between the lock 98 and a screw plug 103 threaded into the valve housing, serves to urge the projection 100 into the opening 80, and when the valve 93 moves either upwardly or downwardly past the projection 100, the latter automatically is forced into the opening 80 and locks the valve in either of its extreme positions. In order to effect a further seal by the valve 93 in either of its extreme positions, a gasket 104 may be disposed between the inner ends of the plugs 85 and 86 and the housing 60, and when the valve 93 is in either of the extreme positions, its engagement with such gasket effects a further sealing of the broken conduit from the remainder of the mechanism.

A gasket 105 may be disposed between the screw plug 102 and housing 60, which normally prevents the screw plug from engaging the lock 98 directly, but should it be desired to temporarily prevent movement of the valve 93 in the passage 80, as for the purpose of bleeding the system of air, the gasket 105 may be removed, in which case the screw plug 102 may be threaded further into the housing 60 until it engages the lock, and then the latter may be forced with such pressure against the valve that the latter cannot move in the passageway 80.

It, of course, is to be understood that more than two conduits may connect the brakes to the valve housing 60, as for example, each brake may be connected by a separate conduit to the housing. In the construction particularly illustrated, should a leak occur in the connections to the front brake, the pressure in the connection to the rear brake, will cause separation of the front connection from the system. However, a leak may occur in the connections to only one of the front brakes, and it should be understood that the construction may be such that only the defective front brake will be disconnected from the system.

The invention is particularly advantageous in hydraulic brake systems, because it prevents a failure of the entire system when a leak occurs in any one part of it. Furthermore, it prevents the escape of the fluid in the system, except for a small part of it in the defective connection. As a result the braking system is more dependable, and motor vehicles equipped with such brakes may be operated with a greater degree of safety.

Although only one form of the invention has been illustrated and described herein, it will be apparent to those skilled in the art that various modifications may be made without departing from the scope of the appended claims.

I claim:

1. In combination, a vessel containing a fluid under pressure and having a pair of ducts connected thereto for transmitting fluid therefrom, fluid operable means connected to the opposite ends of said ducts, means connecting said ducts independently of their connection with said vessel for cutting off the flow of fluid in one duct in response to an inequality in fluid pressure therebetween, and spring pressed pressure displaceable means in each of said ducts for uniformly opposing the flow of fluid therein for creating a difference in pressure between said ducts in response to a variation in the flow of fluid therein.

2. In combination, a vessel containing a fluid under pressure and having a pair of ducts connected thereto for transmitting fluid therefrom, fluid operable means connected to the opposite ends of said ducts, means connecting said ducts independently of their connection with said vessel for cutting off the flow of fluid in one duct in response to an inequality in fluid pressure therebetween, means tending resiliently to retain said last means in an intermediate position between said two ducts, and means resiliently urged toward a predetermined position in each of said ducts for uniformly opposing the flow of fluid therein for creating a difference in pressure between said ducts in response to the variation in the flow of fluid therein.

3. In combination, a vessel containing fluid under pressure and having a pair of ducts connected therethrough for transmitting fluid therefrom, fluid operable means connected to the opposite ends of said ducts, means connecting said ducts independently of their connection with said vessel for cutting off the flow of fluid in one duct in response to an inequality in fluid pressure therebetween, and means resiliently urged toward a predetermined position in each of said ducts between said connecting means and said vessel for uniformly opposing the flow of fluid therein for creating a difference in pressure between said ducts in response to a variation in the flow of fluid therein.

4. In combination, a vessel containing a fluid under pressure and having a pair of ducts connected thereto for transmitting fluid therefrom, fluid operable means connected to the opposite ends of said ducts, means connecting said ducts independently of their connection with said vessel for cutting off the flow of fluid in one duct in response to an inequality of fluid pressure therebetween, and resiliently pressed plug means in said ducts for uniformly opposing the flow of fluid therein for creating a difference in pressure between said ducts in response to a variation in the flow of fluid therein.

5. In combination, a vessel containing a fluid under pressure and having a pair of ducts connected thereto for transmitting fluid therefrom, fluid operable means connected to the opposite ends of said duct, means connecting said ducts independently of their connection with said vessel for shutting off the flow of fluid in one duct in response to an inequality of fluid pressure therebetween, said last means comprising a reciprocatory member operable transversely of said ducts, means accessible from the exterior of said connecting means for securing said reciprocatory member in posiiton for cutting off the flow of fluid in one of said ducts, and resiliently pressed plug means in said ducts for uniformly opposing the flow of fluid therein for creating a difference in pressure between said ducts in response to a variation in the flow of fluid therein.

6. In combination, a vessel containing a fluid under pressure and having a pair of ducts connected thereto for transmitting fluid therefrom, fluid operable means connected to the opposite ends of said ducts, means connecting said ducts independently of their connection with said vessel for cutting off the flow of fluid in one duct in response to the inequality in fluid pressure therebetween, and a spring pressed valve in each of said ducts between said connecting means and said vessel for uniformly opposing the flow of fluid therein and for creating a difference in pressure between said ducts in response to a variation in the flow of fluid therein.

7. In combination, a vessel containing fluid under pressure and having a pair of ducts connected thereto for transmitting fluid therefrom, fluid operable means connected to the opposite ends of said duct, means connecting said ducts independently of their connection with said vessel for cutting off the flow of fluid in one duct in response to an inequality in fluid pressure therebetween, and a spring pressed valve in each of said ducts between said connecting means and said vessel for uniformly opposing the flow of fluid in any direction in said ducts and for creating a difference in pressure between said ducts in response to a variation in the flow of fluid therein.

CLAUDE E. FURGASON.